United States Patent [19]

Piccini

[11] Patent Number: 5,735,186

[45] Date of Patent: Apr. 7, 1998

[54] PUNCHING-NIBBLING PRESS

[76] Inventor: Giancarlo Piccini, Via del Laghetto 12/2, I-16033 Lavagna, Province of Genova, Italy

[21] Appl. No.: 634,260

[22] Filed: Apr. 18, 1996

[30] Foreign Application Priority Data

May 10, 1995 [IT] Italy ................... GE95A0050

[51] Int. Cl.⁶ ................................................. B26F 1/00
[52] U.S. Cl. ........................ 83/685; 83/100; 83/139; 83/701
[58] Field of Search ......................... 83/916, 684, 685, 83/686, 451, 859, 139, 100, 701; 72/293, 305, 311, 329, 327, 336; 408/56, 67; 409/135, 136, 137

[56] References Cited

U.S. PATENT DOCUMENTS

| | | | |
|---|---|---|---|
| 1,999,730 | 4/1935 | Konoff | 72/329 |
| 2,442,901 | 6/1948 | Missbach | 83/100 |
| 3,800,643 | 4/1974 | Scott et al. | 83/916 |
| 4,041,817 | 8/1977 | Nelson | 83/139 |
| 4,089,244 | 5/1978 | Herb et al. | 83/916 |
| 4,200,417 | 4/1980 | Hager et al. | 83/100 |
| 4,425,829 | 1/1984 | Kranik et al. | 83/100 |
| 5,205,686 | 4/1993 | De Caussin | 409/67 |
| 5,325,755 | 7/1994 | Morita . | |
| 5,382,404 | 1/1995 | Kogame | 83/100 |
| 5,509,335 | 4/1996 | Emerson | 409/136 |
| 5,613,811 | 3/1997 | Tilemans | 409/137 |

FOREIGN PATENT DOCUMENTS

| | | |
|---|---|---|
| 0 377 865 | 7/1990 | European Pat. Off. . |
| 0 635 321 | 1/1995 | European Pat. Off. . |
| 1627261 | 9/1970 | Germany ................... 269/21 |
| 23 63 485 | 7/1975 | Germany . |
| 24 53 474 | 5/1976 | Germany . |
| 36 34 149 | 5/1987 | Germany . |

OTHER PUBLICATIONS

Patent Abstracts of Japan, No. JP 6142998 (24 May 1994), Takeshi.

Patent Abstracts of Japan, No. JP 4033800 (5 Feb. 1992), Hideo.

*Primary Examiner*—Kenneth E. Peterson
*Attorney, Agent, or Firm*—Larson & Taylor

[57] ABSTRACT

Punching-nibbling press, in particular for sheet metal or the like includes at least one punch or stamp mounted coincident with a coaxial die or mold. The punch can be moved in the direction of the die, executing a punching-nibbling stroke towards the die and against a workpiece interposed between the die and the punch, and a stroke of withdrawal from the die and from the workpiece. The punching-nibbling press is provided with vacuum chambers for screening, suppressing or removing noise generated by the press. The vacuum chambers surround the punch and the die. The vacuum chamber which surrounds the punch is in the form of a hood which adapts to the position of the punch during its stroke and always remains active during the latter.

8 Claims, 6 Drawing Sheets

PUNCHING-NIBBLING PRESS

BACKGROUND OF THE INVENTION

The invention relates to a punching-nibbling press, in particular for sheet metal or the like, comprising at least one punch or stamp mounted coincident with a coaxial die or mould, which punch can be moved in the direction of the die, executing a punching-nibbling stroke towards the die and against a workpiece which can be interposed between the die and the punch, and a stroke of withdrawal.

Nibbling presses of this type produce slots or notches in the sheet through the combined action of the punch which is compressed, with an alternating motion, against the surface of the sheet and the complementary die which constitutes the counterpart on the opposite side of the sheet being worked. With this type of working it is possible to make slots of any shape, cuts in pieces of sheet of preset shape, borders etc., with high speed and accuracy. However, this type of working is associated with considerable generation of noise and therefore is harmful both for the operators and for the environment in general.

The noise is generated in the area of the punching-nibbling head, and in particular from the mechanical action of the movable punch. Moreover the absorption, attenuation or suppression of the noise is complicated because of the rapidity with which the nibbling passes follow one another during the working operation.

SUMMARY OF THE INVENTION

It is an object of the invention to produce a punching-nibbling press of the type described above, in such a way that, by virtue of simple and inexpensive expedients, it is possible to obtain effective screening or suppression of noise during operation without compromising either the functionality of the press or its convenience of use, in particular in relation to the ability to replace the punch and the associated die.

The invention solves the above problem with a punching-nibbling press which is provided with means for screening, suppressing or removing noise generated by the punch, which means extend within the area of the movable punch and of the die, adapting themselves to the position of the said punch during its stroke and always remaining active during the latter.

A vacuum or a suction flow is generated in the area of the punch and possibly also of the die by virtue of suction means or of a vacuum source which are connected to the said areas by vacuum or suction ducts.

In one embodiment of the invention the punch-holder head, the die-holder head and the die are screened at least partly in relation to the outer environment by stationary walls, each of which forms a chamber for accommodating the said heads and which chambers are at least partly closed to the outside and are connected or connectable to a vacuum or suction source through ducts. The punch is provided with integral means for screening, the chamber formed by said means being coaxial to said punch and in communication with said vacuum or suction ducts.

In this case it is possible for the wall of the chambers which accommodates the punch-holder head and the die-holder head to be stationary and made in such a way as to surround the said heads at least laterally. The wall of the chamber which accommodates the punch-holder head extends to the end of the movable portion of the punch-holder head to which said punch is connected, said end comprising a plate provided with ducts that put in communication the chamber formed by the integral means of screening of said punch and the chamber which accommodates the punch-holder head. The wall of the chamber which accommodates the die-holder head terminates level with the surface of the die for contact with the workpiece and has an opening for the said die which is surrounded by an annular flange for contact with the workpiece and which flange is coplanar with the corresponding surface of the die. In this way, when the punch hits the workpiece, the suction or vacuum circuit becomes closed with the minimum noise dispersion.

Means for screening integral to said punch can comprise a tubular hood which extends for the whole length of the punch.

The press according to the invention makes it possible effectively to reduce noise generated during operation, with obvious advantages both for the service personnel and in general for the environment. The reduction in noise is particularly effective when, as well as the screening walls are fabricated of or covered by sound-absorbent material.

BRIEF DESCRIPTION OF THE DRAWINGS

The characteristic features of the invention and the advantages deriving therefrom will emerge in greater detail from the description of a few preferred embodiments, illustrated by way of non-limiting example in the appended drawings in which.

DESCRIPTION OF THE PREFERRED EMBODIMENT OF THE INVENTION

Figure 1:
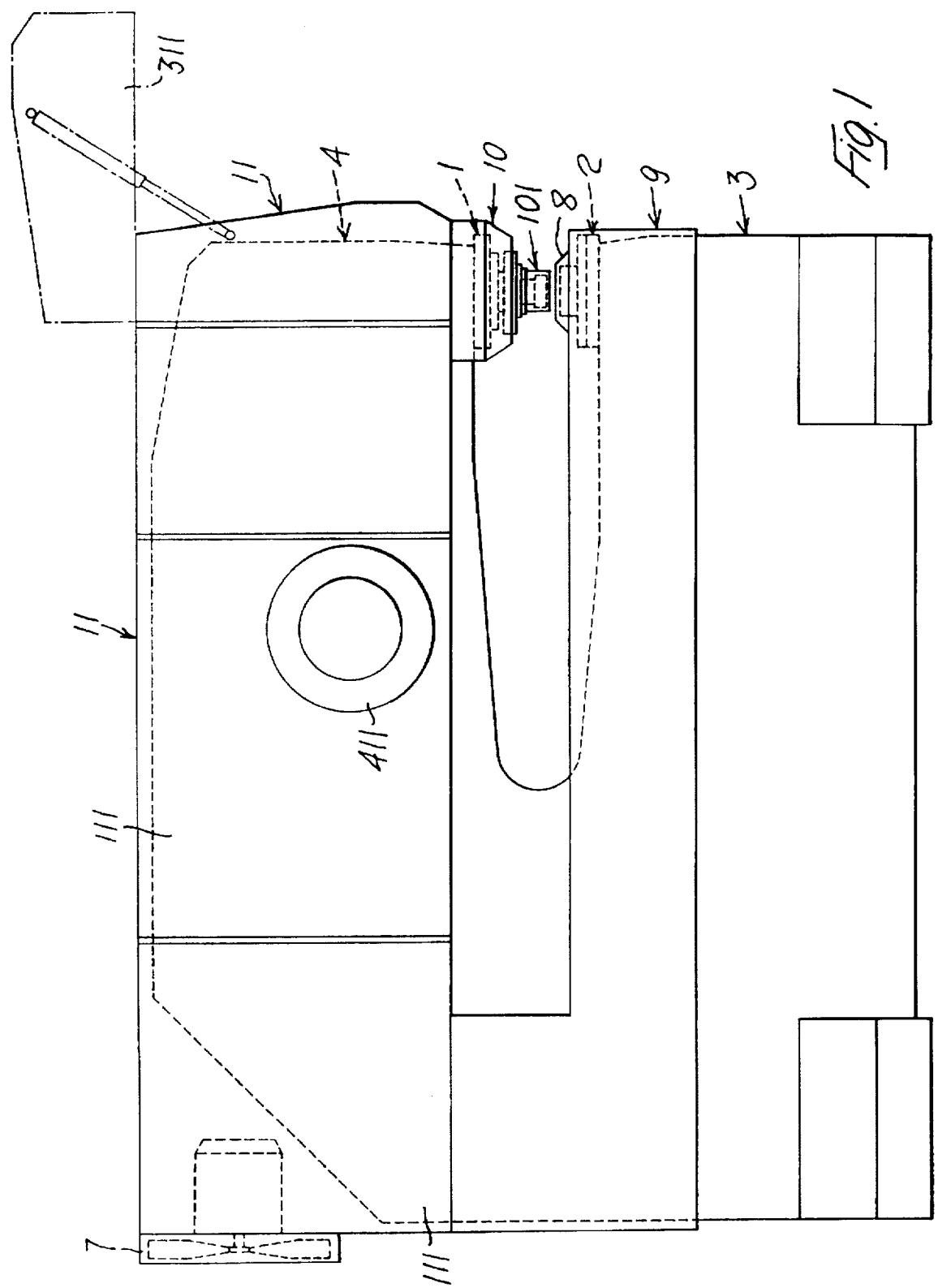
FIG. 1 illustrates a side elevational view of a punching-nibbling press according to the invention.

With reference to the figures, a punching-nibbling press has a punch-holder head indicated overall as 1 and an opposing die-holder head indicated overall as 2. The punch-holder head 1 and the die-holder head 2 are arranged vertically aligned with one another and a certain distance apart substantially of the order of magnitude of the stroke of the punch. The die-holder head 2 is supported by a bed element 3, above which, a predetermined distance away, such as to form a channel for the passage of the sheet, there extends a swan-neck pillar 4—illustrated dashed—which supports the punch-holder head 1.

The die-holder head 2 and the punch-holder head 1 are accommodated respectively in two coaxial chambers 5, 6. The chamber 5 of the die-holder head 2 is open on the side facing the punch-holder head 1. The chamber 6 has the side facing the die-holder head 2 occupied by the plate 301 fitted at the end of the thruster shank 401 of the punch-holder head 1. Said plate 301 slides airtightly thanks to the sealing means 310 on the inner side of the wall 110 of the chamber 6, for the whole stroke of said thruster shank 401. The chambers 5, 6 communicate by virtue of ducts with a vacuum source, or suction source which in the figure is indicated diagrammatically by a fan 7 and which is provided in the rear part of the press. In this way, in the area of the die-holder and punch-holder heads, and hence in the area of greatest generation of noise, a vacuum or a suction flow is created which considerably reduces the propagation of sound waves.

As shown in the figures, the chamber 5 associated with the die-holder head 2 is delimited externally by a coaxial frustoconical wall 8 which surrounds the die-holder head 2 laterally. The frusto-conical wall 8 narrows in the direction of the workpiece P (FIG. 4) and has a hole coaxial with the die 102 on the side on which the latter contacts the workpiece. The rim of the hole consists of an annular flange 108 coaxial with the die 102 and substantially coplanar with die surface 102 which contacts the workpiece. In this way, the workpiece seals the vacuum chamber 5 sufficiently tightly. The ducts connecting the vacuum chamber 5 to the vacuum source or suction source are formed by an external casing 9 which covers at least part of the bed externally and extends at a certain distance from its walls, preferably along the upper part thereof. The said casing 9, in addition to forming the ducts for communication between the chamber 5 and the vacuum source or suction source, constitutes a kind of screening. The casing 9 can extend partly along the flanks and also along the upper surface of the bed 3 and can be formed of individual panels, or the like, preferably of sound-absorbent material or of some other material which is covered internally with sound-absorbent panels.

With reference to the example illustrated, the wall 8 delimiting the chamber 5 associated with the die 2 is divided into at least two parts, one of which is fixed and the other removable, so as to allow the die set, comprising the die 102 and a support plinth 202, to shift transversely through its axis.

Figure 3:
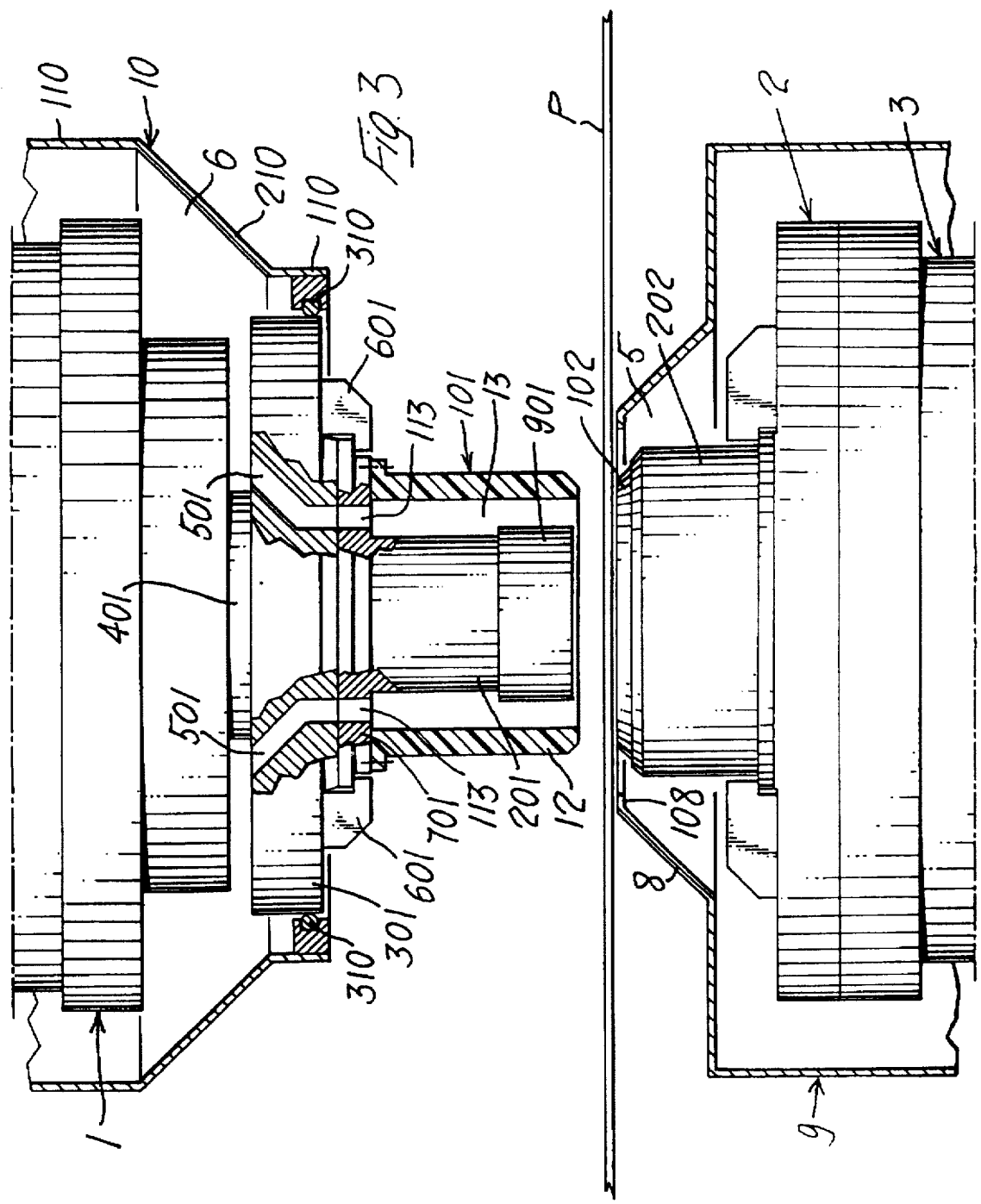
FIG. 3 illustrates an axial section of the facing punch-holder and die-holder heads of a press according to the previous figures, the punch-holder head being in a non-active position.
Figure 4:
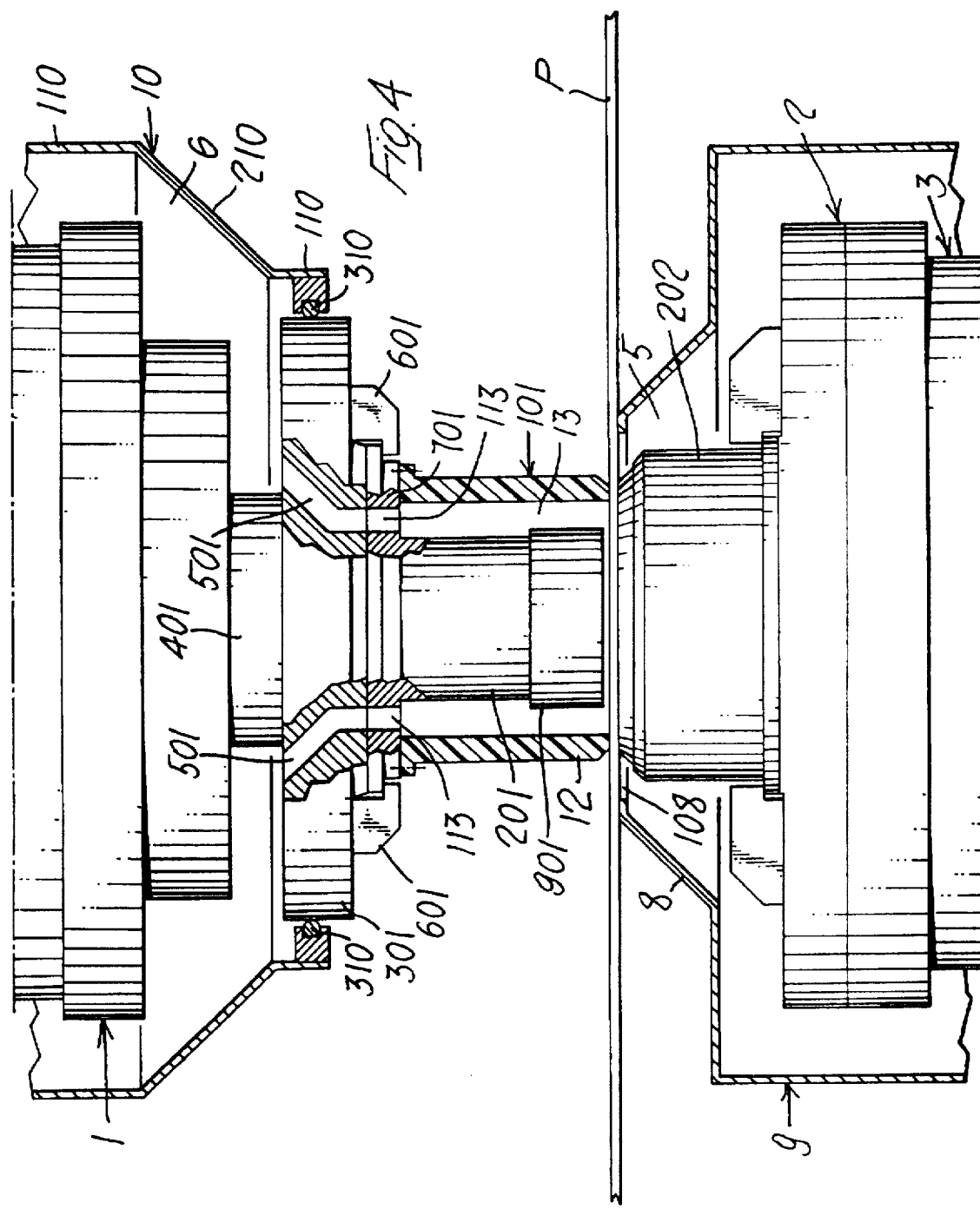
FIG. 4 illustrates an axial section of the facing punch-holder and die-holder heads of a press according to the previous figures, the punch-holder head being in an active position.

Like the die-holder head 2, the punch-holder head is also accommodated in a vacuum chamber 6 which is delimited at least by substantially cylindrical stationary walls 10, or by walls formed by combinations of cylindrical spans 110 which are joined together by frustoconical narrowings 210 directed towards the end remote from the die-holder head 2. The punch-holder head 1 comprises, as illustrated in FIGS. 3 and 4, a thruster shank 401 at end of which is fitted a plate 301 provided with means 601 of connection of the punching unit 101. Such punching unit 101 comprises a support plinth 201 provided with a connecting flange 701 for connection with the plate 301, means for screening consisting of a hood 12, and a punch 901 at the end of the support plinth 201. The plate 301 is provided with ducts 501 formed therein, and flange 701 is also provided with a plurality of ducts 113. The ducts 501 of the plate 301, and the ducts 113 of the flange 701 put in communication the chamber 6 accommodating the punch-holder head 1 and the chamber 13 accomodating the plinth 201-punch 901 assembly. Chamber 113 is enclosed by hood 12 which extends for the whole length of the plinth 201-punch 901 assembly.

As illustrated in FIG. 4, when the punching unit 101 hits the workpiece P, the latter closes both the reciprocally faced sides of chamber 13 of the punching unit 101 and of chamber 5 of the die-holder head 2, thus damping noise generated during the punching process.

Advantageously, in the embodiment illustrated in FIGS. 3 and 4, the hood 12 acts also as a blank-holder, that is it contacts the surface of the workpiece P before the punching of punch 901, and keeps said workpiece in the right position. The hood 12 will be in such case made of a sufficiently stiff material, but also sufficiently deformable to allow the punching action, and also resilient. Preferably, hood 12 is made of natural or synthetic rubber.

Figure 2:
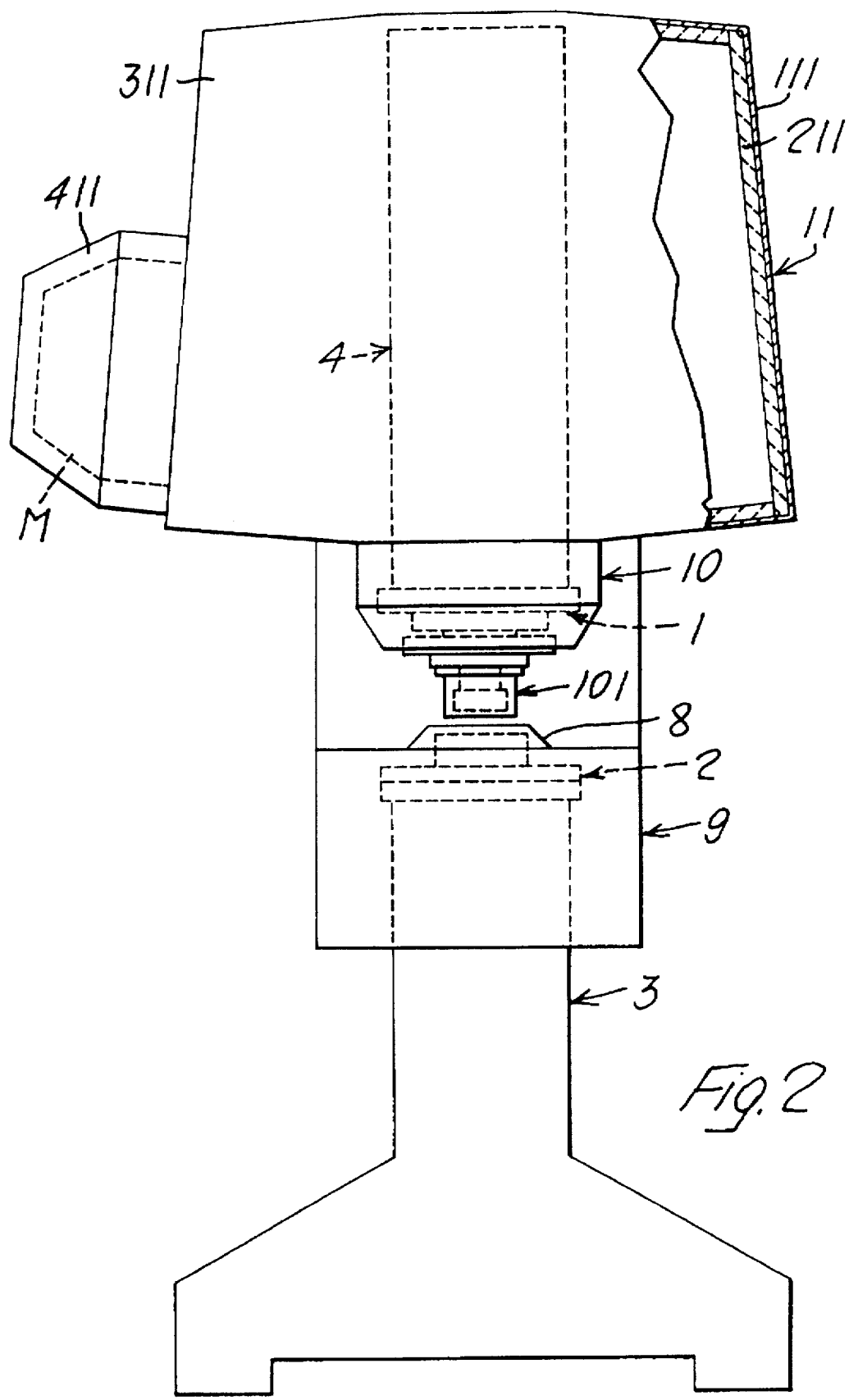
FIG. 2 illustrates a front elevational view, partially sectioned, of the press according to FIG. 1.
Figure 6:
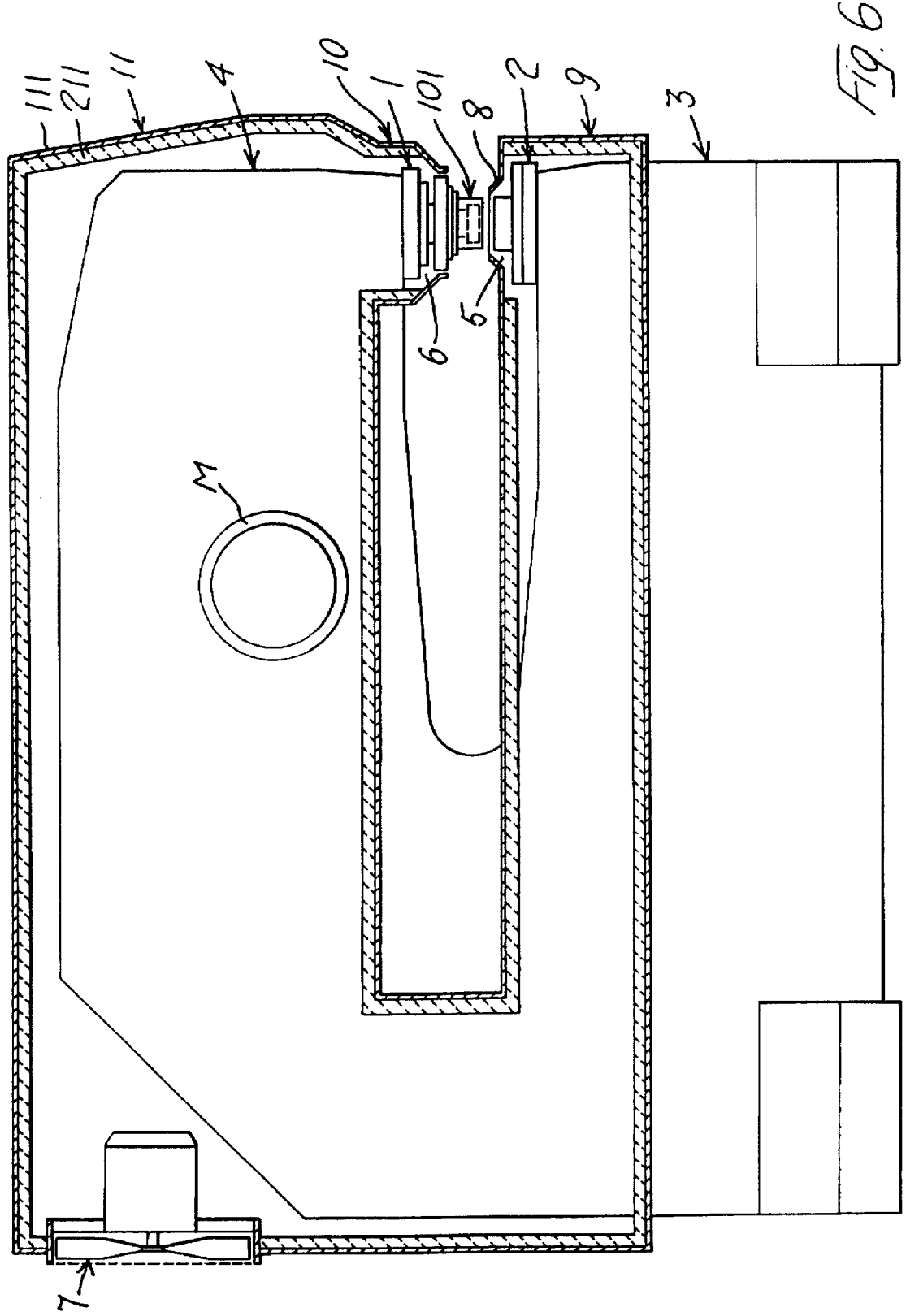
FIG. 6 illustrates a side elevational view of the punching-nibbling press of FIG. 1, partially in section.

The vacuum/suction source 7 communicates with the vacuum chamber 6 associated with the punch-holder head 1 through ducts and/or chambers formed by a cowling 11 of the swan-neck pillar 4 which is substantially similar to casing 9 of bed 3. FIGS. 1, 2 and 6 show clearly the construction with panels 111 of casing 11, which panels 111 can also be dismantled and erected individually. In this case also, the panels 111 can be of any sound-absorbent material or of any composite type, or they can be covered inside with slabs, or layers of any sound-absorbent material such as for example glass wool with a strip of lead or some other metallic material, as indicated diagrammatically by 211 in FIGS. 2 and 6. Further, as illustrated in FIG. 1, the casing 11 can be provided with openable doors 311, made in the same manner and of the same material as the panels 111, allowing in such way a fast access for the inspection and the maintenance operations inside the machine.

The casing 11 also includes a housing 411 covering motor M of the press to suppress noise generated by motor M.

In rear area the casing 11 of the swan-neck pillar 4 and casing 9 of the bed 3 can be connected together and to a common vacuum or suction source 7 as shown in FIG. 6, or they can each have their own suction or vacuum-generating unit.

Figure 5:
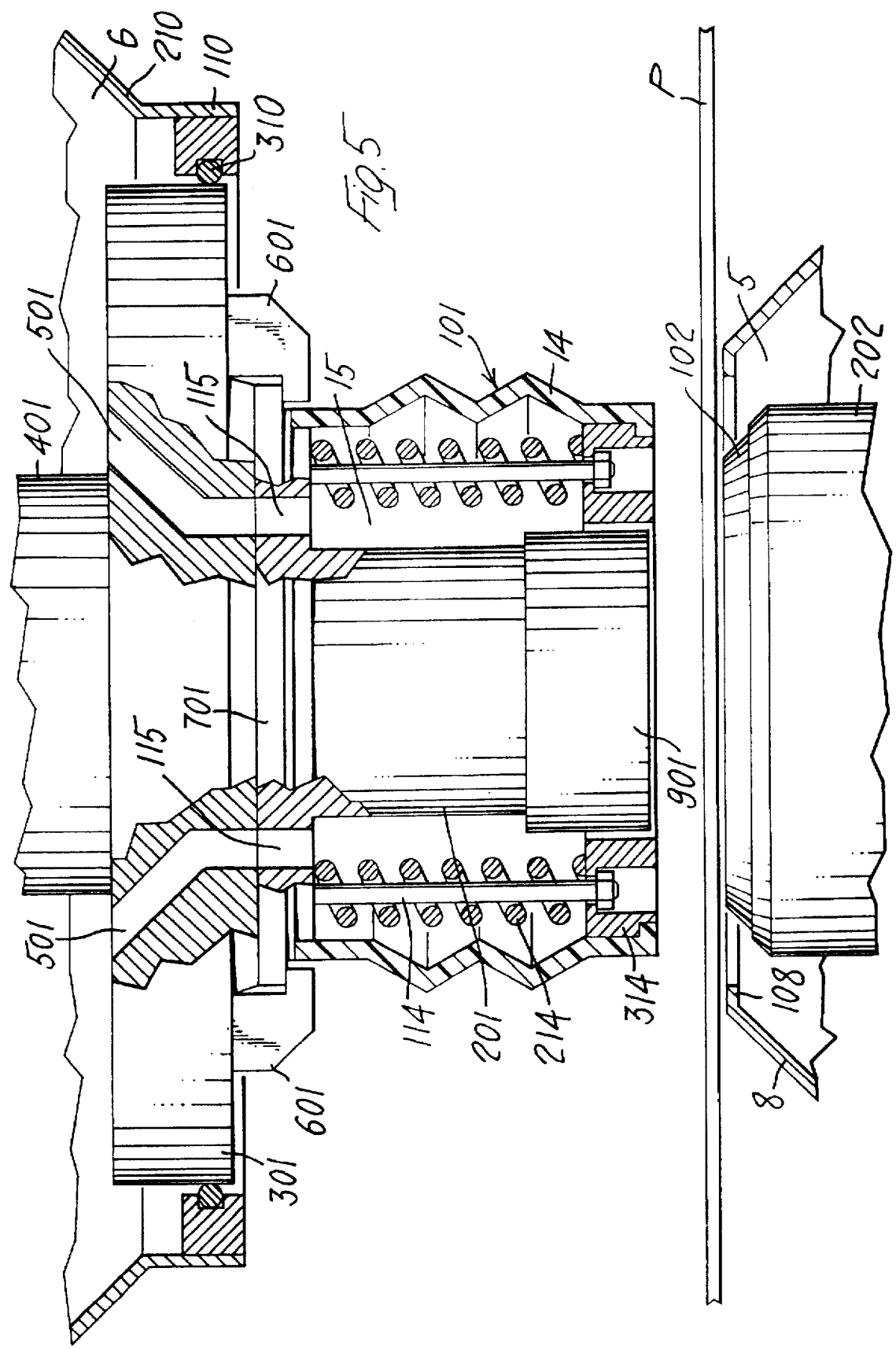
FIG. 5 illustrates an enlarged axial section of an alternative embodiment of the present invention.

An alternative embodiment of the means for suppressing noise of punching unit 101 is illustrated in FIG. 5. The punching unit 101 in this case comprises a connection flange 701 to which are fixed at one end guide pins 114. On the opposite end of such guide pins 114 is slidebly mounted a blank-holder ring 314. The ring 314 is loaded by springs 214 mounted on the guide pins 114 so as to press, at the moment immediately preceeding the punching, the sheet metal between such ring 314 and the flange 108 of the wall 8 of chamber 5 accommodating the die-holder head 2. The hood 14 is connected at one end to the flange 701, and at the opposite end to the ring 314. In such case, the hood 14 performs merely the task of sound-proofing the punching unit 101.

In fact, the chamber 15, formed by the hood 14 and coaxial to the plinth 201-punch 901 assembly, communicates through the ducts 115 of flange 701 and through ducts 501 of plate 301 with the chamber 6, and then with the suction or vacuum fan 7, connected to said chamber 6. The task of locking the workpiece P is performed by a blank-holder element consisting of ring 314 slidably mounted on the guide pins 114 and loaded by the springs 214.

Naturally, the invention is not limited to the embodiments described and illustrated herein but can be broadly varied and modified, especially constructively. Hence, for example, the means for generating the vacuum or the suction flow when they are provided can be of differing type such as suction fans, pumps, and can also be of a type with variable capacity, so as to allow regulation. Furthermore, the shapes, the extensions and the type of materials, such as panels or the like for the casings 10, 11 and also for the walls 8, 10 can be of any type. The same concept of suppression, absorption or screening of the noise generated in punching-nibbling presses can simply be carried over to machines which provide at least one tool which can be moved against a workpiece with an alternating motion or else with any type of motion.

I claim:

1. A punching-nibbling press comprising:

a bed;

a die unit mounted on said bed and comprising a die-holder head and a die mounted on said die-holder head, said die having a workpiece-contacting surface;

a punching unit comprising a punch-holder head and a punch mounted on said punch-holder head, said punch having a workpiece-contacting surface;

a pillar fixed to said bed and supporting said punching unit, such that said punch is positioned coaxially above and facing said die with the workpiece-contacting surface of said punch facing the workpiece-contacting surface of said die, and such that the punch is spaced above said die a distance sufficient to allow a workpiece to be positioned between the workpiece-contacting surfaces of said punch and die;

means for moving said punch in a direction towards the die to effect a punching-nibbling stroke on a workpiece interposed between said workpiece-contacting surfaces of said punch and die, and for moving said punch in a direction away from the die to effect a return stroke;

a die-noise suppressing vacuum chamber formed by a wall laterally surrounding said die unit, said die-noise suppressing chamber having an aperture which faces said punch, said aperture being coaxial with the die and being substantially coplanar with the workpiece-contacting surface of said die, said die-noise suppressing chamber being closed to the environment by placement of a workpiece over said aperture;

a punch-holder head-noise suppressing vacuum chamber formed by a wall laterally surrounding said punch-holder head;

a punch-noise suppressing vacuum hood laterally surrounding said punch and mounted for movement therewith, said hood having an aperture which faces said die, said aperture having a rim which is coaxial with said die and which allows said punch to be moved therethrough during motion of said punch in said punching-nibbling and return strokes, said vacuum hood being closed to the environment except for said aperture, said aperture being positioned such that said rim of said aperture contacts a workpiece when the punch contacts a workpiece which is positioned between the workpiece-contacting surfaces of said punch and die, thereby causing said punch-noise suppressing vacuum hood to be closed to the environment;

a noise-suppressing vacuum chamber at least partially enclosing said bed;

a noise-suppressing vacuum chamber at least partially enclosing said pillar;

suction means for creating a vacuum in said vacuum hood and in each of said noise-suppressing vacuum chambers;

conduit means connecting said vacuum hood and each of said noise-suppressing vacuum chambers to said suction means for creating a noise-suppressing vacuum in said hood and in each of said chambers, each of said vacuum chambers being closed to the environment except for the aperture of said die-noise-suppressing vacuum chamber which is closed to the environment by placement of a workpiece thereover, and except for the aperture of said punch-noise-suppressing hood which is closed to the environment when the rim of said aperture contacts a workpiece interposed between the workpiece-contacting surfaces of said punch and die.

2. A press according to claim 1 wherein said hood is coaxial with said punch.

3. A press according to claim 1 wherein the wall forming the die-noise-suppressing vacuum chamber and the wall forming said punch-holder head-noise suppressing vacuum chamber are stationary, and wherein said conduit means comprises a duct between said punch-holder head-noise suppressing vacuum chamber and said punch-noise suppressing vacuum hood.

4. A press according to claim 3 further comprising means for removably attaching said punch to said punch-holder head, said punch attaching means comprising a flange which is mounted for movement with said punch and which includes at least one aperture forming a duct between said punch-holder head-noise suppressing vacuum chamber and said punch-noise suppressing vacuum hood.

5. A press according to claim 1 wherein said rim of said hood comprises a workpiece holding element.

6. A press according to claim 1 wherein said hood is made of resilient yielding material.

7. A press according to claim 1 wherein at least one of said noise-suppressing vacuum chambers comprises sound absorbent walls.

8. A press according to claim 7 wherein said sound absorbent walls comprise sound absorbent wall panel.

* * * * *